(12) United States Patent
Droste

(10) Patent No.: US 11,919,721 B2
(45) Date of Patent: Mar. 5, 2024

(54) TRANSVERSE-BELT SORTER HAVING A CONTROL DEVICE

(71) Applicant: Interroll Holding AG, Sant'Antonino (CH)

(72) Inventor: Heinrich Droste, Sinsheim (DE)

(73) Assignee: Interroll Holding AG, Sant' Antonino (CH)

( * ) Notice: Subject to any disclaimer, the term of this patent is extended or adjusted under 35 U.S.C. 154(b) by 568 days.

(21) Appl. No.: 17/264,863

(22) PCT Filed: Jul. 17, 2019

(86) PCT No.: PCT/EP2019/069281
§ 371 (c)(1),
(2) Date: Feb. 1, 2021

(87) PCT Pub. No.: WO2020/025329
PCT Pub. Date: Feb. 6, 2020

(65) Prior Publication Data
US 2021/0292099 A1    Sep. 23, 2021

(30) Foreign Application Priority Data

Jul. 30, 2018 (DE) .......................... 102018006014.5

(51) Int. Cl.
*B65G 43/08* (2006.01)
*B07C 3/08* (2006.01)
(Continued)

(52) U.S. Cl.
CPC ................ *B65G 43/08* (2013.01); *B07C 3/08* (2013.01); *B65G 17/345* (2013.01); *B65G 47/96* (2013.01);
(Continued)

(58) Field of Classification Search
CPC ...... B65G 43/08; B65G 47/96; B65G 17/345; B65G 2203/0258; B65G 2203/04; B07C 3/08
(Continued)

(56) References Cited

U.S. PATENT DOCUMENTS 4,096,936 A    6/1978 Nielsen
4,915,209 A    4/1990 Canziani
(Continued)

FOREIGN PATENT DOCUMENTS

CN    105618384 A    6/2016
CN    107666972 A    2/2018
(Continued)

*Primary Examiner* — Douglas A Hess
(74) *Attorney, Agent, or Firm* — Michael Soderman

(57) ABSTRACT

A control device for activating a transverse belt (8) of a conveying carriage (6) of a transverse-belt sorter (2), wherein a transverse-belt conveyor (4) for conveying an article in a transverse conveying direction, which is oriented substantially transversely to the conveying direction of the transverse-belt sorter (2), is formed on the conveying carriage (6), and wherein the transverse belt (8) can be driven mechanically, wherein the control device is configured so that, when the article is introduced laterally onto the transverse belt (8), it activates the transverse belt (8) such that the article is transported to a conveying position on the transverse belt (8) or, when the article is discharged laterally, it activates the transverse belt (8) such that the article is transported in the downward direction from a conveying position on the transverse belt (8); and wherein, when the article is introduced and/or discharged laterally, the control device activates the transverse belt (8) at least in dependence on a mass of the article.

10 Claims, 2 Drawing Sheets

(51) Int. Cl.
*B07C 5/36* (2006.01)
*B65G 17/34* (2006.01)
*B65G 47/96* (2006.01)

(52) U.S. Cl.
CPC .. *B65G 2203/0258* (2013.01); *B65G 2203/04* (2013.01)

(58) Field of Classification Search
USPC .............................. 198/358, 370.06, 370.08
See application file for complete search history.

(56) References Cited

U.S. PATENT DOCUMENTS

| | | | | |
|---|---|---|---|---|
| 5,690,209 | A * | 11/1997 | Kofoed | B65G 17/345 198/370.06 |
| 7,816,617 | B2 * | 10/2010 | Bennett | B07C 3/02 198/370.01 |
| 9,154,016 | B2 * | 10/2015 | Chierego | B65G 47/962 |
| 9,233,803 | B2 * | 1/2016 | Pilarz | B65G 17/345 |
| 9,409,716 | B2 * | 8/2016 | Bastian, II | B65G 43/08 |
| 9,493,313 | B2 * | 11/2016 | Vegh | B65G 43/08 |
| 9,511,949 | B2 * | 12/2016 | Fujihara | B65G 43/08 |
| 9,708,131 | B2 * | 7/2017 | Fujihara | B65G 17/345 |
| 9,783,370 | B2 * | 10/2017 | Fujihara | B65G 65/005 |
| 10,377,576 | B2 * | 8/2019 | Zak | B65G 47/34 |
| 11,267,657 | B2 * | 3/2022 | Wang | B65G 35/08 |
| 11,420,833 | B2 * | 8/2022 | Aschpurwis | B65G 47/71 |
| 2003/0221935 | A1 | 12/2003 | Barklin et al. | |
| 2016/0257502 | A1 | 9/2016 | Fujihara | |

FOREIGN PATENT DOCUMENTS

| | | |
|---|---|---|
| EP | 0343613 A2 | 11/1989 |
| EP | 0930248 A2 | 7/1999 |
| EP | 0930248 B1 | 7/1999 |
| EP | 2990358 A1 | 3/2016 |
| EP | 3064285 A1 | 9/2016 |
| WO | 2016208566 A1 | 12/2016 |
| WO | 2020025329 A1 | 2/2020 |

* cited by examiner

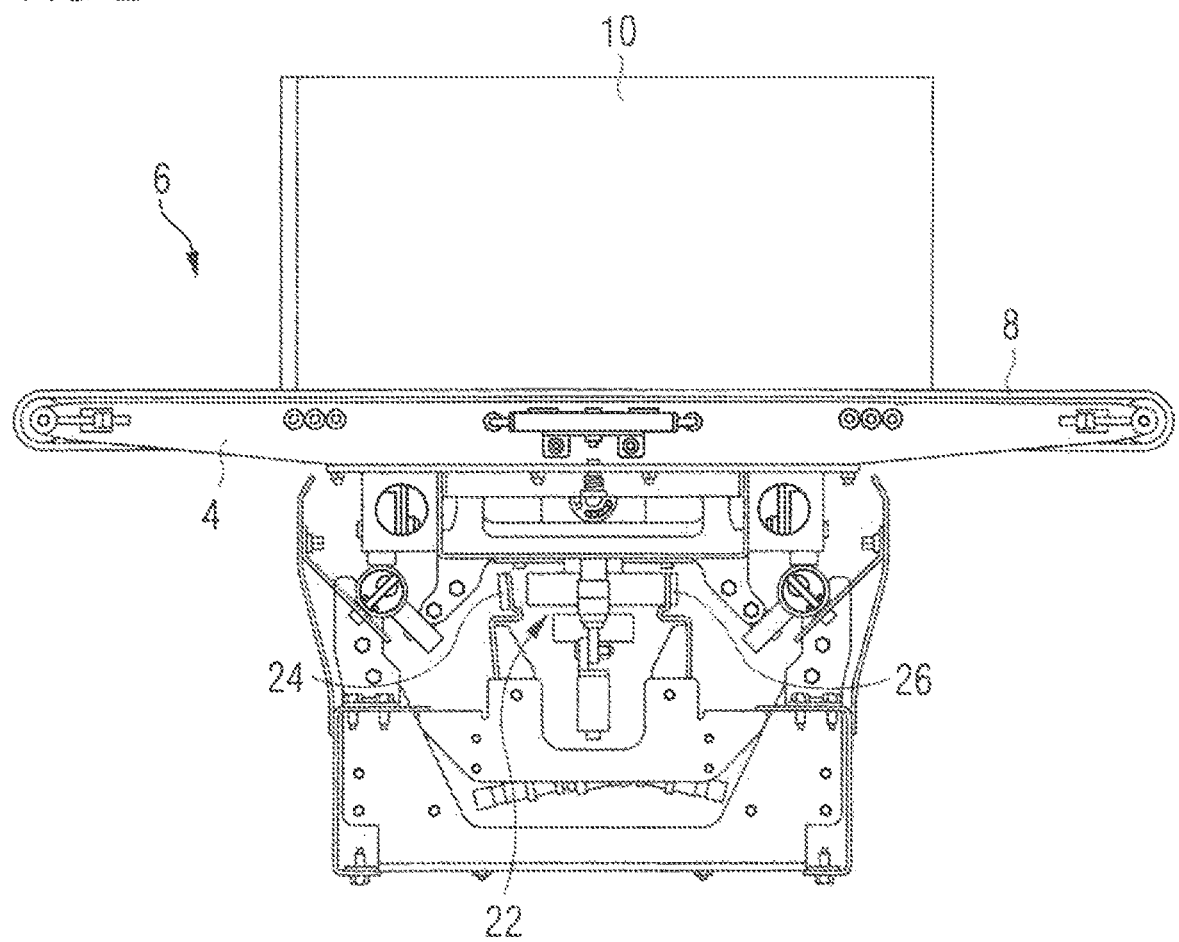

TRANSVERSE-BELT SORTER HAVING A CONTROL DEVICE

CROSS REFERENCE TO RELATED APPLICATIONS

This application is the U.S. national stage of International Application No. PCT/EP2019/069281, filed on 2019 Jul. 17. The international application claims the priority of DE 102018006014.5 filed on 2018 Jul. 30; all applications are incorporated by reference herein in their entirety.

BACKGROUND

The invention relates to a control device for activating a cross belt of a conveying truck of a cross-belt sorter, to a cross-belt sorter with at least one control device, and to a method for charging and/or discharging a conveyed material onto a conveying truck of the cross-belt sorter.

In known cross-belt sorters the conveying truck is equipped with a cross-belt conveyor—that is to say, with a cross belt arranged and capable of being driven at right angles to the conveying direction. Several such conveying trucks are preferably employed as a circulating truck chain, in order to pick up and convey piece goods for high-output distribution in postal centers and distribution centers. In this connection, in the case of the cross-belt conveyor it is customary to provide a separate drive-source, fed by ancillary energy, for driving the cross belt. With this configuration the cross belt is capable of being accelerated—for instance, by means of suitable activation of the drive-source—during charging of a conveyed material, in order to guarantee a desired positioning of the conveyed material.

However, the use of a cross-belt conveyor having a cross belt that is driven without a drive-source fed with ancillary energy offers considerable advantages such as, for instance, simpler structural design and no requirement for the supply of ancillary energy to the mobile conveying truck(s). With such a cross-belt conveyor, the cross belt is capable of being driven mechanically, for instance. But with such a configuration the problem arises of the effective positioning of the conveyed material on the cross-belt conveyor, because, in principle, by virtue of the mechanical drive means the cross belt is able to run freely. In particular, there is the danger that the conveyed material will not be completely charged onto the conveying truck or will be transported too far onto the conveying truck and will project laterally beyond the conveying truck. In this case, damage to the conveyed material and/or malfunctions in the operation of the cross-belt sorter may occur.

The aforementioned cross belt, capable of being driven mechanically, of the conveying truck of the cross-belt sorter is usually capable of being activated by means of a control device in such a manner that the conveyed material to be charged laterally onto the conveying truck is positioned in a conveying position on the cross belt. In this case, a central positioning region, seen in a top view, of the conveyed material is ideally caused to overlap, at least partially, a central target region of the cross-belt conveyor. The cross belt of the conveying truck onto which the conveyed material is to be charged is usually being driven in the direction of a cross transport path of the conveyed material from a charging position at a lateral edge of the conveying truck to the conveying position, even before contact of the conveyed material with the cross belt. Consequently, it has previously been ensured that the laterally charged conveyed material is completely positioned on the cross belt of the cross-belt conveyor and does not protrude laterally beyond the cross belt of the cross-belt conveyor. Analogously, the aforementioned mechanically drivable cross belt of the conveying truck of the cross-belt sorter is capable of being activated by means of the control device in such a manner that the conveyed material to be discharged laterally from the conveying truck is transported away from the conveying position on the cross belt and leaves the conveying truck completely, in order that the laterally discharged conveyed material no longer protrudes laterally into the cross belt of the cross-belt conveyor.

Nevertheless, in the course of the lateral charging onto the conveying truck it may happen that conveyed material is not transported to the desired conveying position described above but, in particular, is transported beyond the conveying position.

SUMMARY

Against this background, it is an object of the invention to make available a control device for activating a cross belt of a conveying truck of a cross-belt sorter, a cross-belt sorter with at least one control device, and a method for charging and/or discharging a conveyed material onto a conveying truck of the cross-belt sorter, with which a positioning of the conveyed material on the conveying truck is improved and there is no longer the danger of charged conveyed material projecting laterally beyond the conveying truck, or, in some cases, of discharged conveyed material still remaining on the conveying truck.

The object is achieved by the subjects of the independent claims. Preferred embodiments arise out of the dependent claims.

DETAILED DESCRIPTION

One aspect relates to a control device for activating a cross belt of a conveying truck of a cross-belt sorter, a cross-belt conveyor for conveying a conveyed material in a cross conveying direction oriented substantially at right angles to the conveying direction of the cross-belt sorter having been formed on the conveying truck, and the cross belt being capable of being driven mechanically. The control device is configured to activate the cross belt in the course of the lateral charging of the conveyed material onto the cross belt in such a manner that the conveyed material is transported to a conveying position on the cross belt, or is configured to activate the cross belt in the course of the lateral discharging of the conveyed material in such a manner that the conveyed material is transported down from a conveying position on the cross belt. In the course of the lateral charging and/or discharging of the conveyed material, the control device activates the cross belt at least in a manner depending on a mass of the conveyed material.

One advantage of this aspect is that a reliable positioning of the conveyed material on the conveying truck in the course of the charging and/or discharging of the conveyed material, depending on the mass thereof, is guaranteed. There is also no longer the danger of the conveyed material driving the cross belt in uncontrolled manner by virtue of the inertia acting on the conveyed material in the course of the lateral charging, and in this way moving unintentionally on the conveying truck and possibly even projecting laterally beyond the conveying truck. Furthermore, there is also no danger that the conveyed material to be charged and/or discharged laterally will not be completely charged onto the conveying truck and/or will not be completely discharged from the conveying truck and may still protrude laterally into the conveying truck after the charging or discharging.

In addition, in the case of mass-dependent activating of the cross belt in the course of the lateral discharging of the conveyed material a slippage in the mechanical drive can be taken into account, the magnitude of which likewise depends on the inertia and consequently also on the mass of the conveyed material to be discharged.

Consequently, a precision in the course of discharging can be increased, in order to be able to discharge the conveyed material securely even into narrow discharge stations.

The control device for activating the cross belt of the conveying truck of the cross-belt conveyor may exhibit one or more input appliances and/or output appliances and an internal or external central unit. By means of the central unit, one or more output values, by means of which at least the cross belt is capable of being activated, can be calculated from one or more input values.

The cross-belt sorter may exhibit several conveying trucks for transporting conveyed material in a conveying direction of the cross-belt sorter, in which case a series or chain of the conveying trucks arranged one behind the other may form a closed ring along a transport path. The transport path or, to be more exact, the cross-belt sorter may have been defined by transport rails on which the conveying trucks have been arranged so as to be mobile in the conveying direction by means of rollers or wheels. For the purpose of driving the conveying trucks, the conveying trucks may each have been connected to a drive chain which circulates substantially following the course of the transport path. The spacing of the conveying trucks from one another in the conveying direction is consequently predetermined or capable of being predetermined.

For the purpose of transporting the conveyed material, the conveying truck of the cross-belt sorter may exhibit a conveying surface designed to be substantially perpendicular to a direction of gravitational force, on which the conveyed material is capable of being set down by reason of the gravitational force acting on the conveyed material and is consequently capable of being transported by means of the conveying truck. In the case of several conveying trucks in the cross-belt sorter, at least one of the conveying trucks exhibits a cross-belt conveyor for conveying conveyed material in a cross conveying direction at right angles to the conveying direction of the conveying device.

The cross-belt conveyor may have been provided for lateral charging and/or discharging of conveyed material in the cross conveying direction, in which case the cross belt of the cross-belt conveyor is capable of being driven in the respectively desired cross conveying direction, in particular in a first cross conveying direction and in a second cross conveying direction oriented contrary to the first. In other words, viewed in the conveying direction the conveyed material can be charged onto the conveying truck from the left or from the right and/or discharged from the conveying truck to the left or to the right by means of the cross-belt conveyor.

The conveying position defined on the cross belt may be a position in which the conveyed material can be transported by means of the cross-belt sorter without projecting laterally beyond the conveying truck or the cross-material conveyor. In the conveying position, a central positioning region, seen in top view, of the conveyed material has ideally been caused to overlap, at least partially, a central target region of the cross-belt conveyor.

The mechanical drive of the cross belt may exhibit a counterpressure roller, a friction roller, a friction wheel and at least one actuating flap. The counterpressure roller may have been arranged between the diverting rollers of the cross belt as one of the guide rollers of the cross belt, in which case the cross belt has been clamped between the counterpressure roller and the friction roller arranged parallel to the counterpressure roller. The friction roller has been connected to the friction wheel via a gear mechanism. As soon as the friction wheel is being driven by means of the actuating flap, the cross belt is consequently being driven via the gear mechanism, the friction roller and the counterpressure roller. Further elements that bring about a stepping-up or stepping-down of the gear ratio may have been provided on the friction wheel. Alternatively, for the purpose of driving the cross belt the friction wheel may also have been connected to one of the diverting rollers via a gear mechanism.

The conveying direction is the direction in which the conveying trucks move along in the cross-belt sorter.

The cross conveying direction is the direction in which the cross belt has been or is being driven, the cross conveying direction being oriented perpendicular to the conveying direction.

The terms "at the rear" or "behind" and such like which are used below mean, in the context of the present invention, a direction contrary to the conveying direction of the conveying device and/or a position of one element relative to another element with respect to the conveying direction. The terms "at the front" or "in front of" and such like which are used below mean, in the context of the present invention, a direction in the conveying direction of the conveying device and/or a position of one element relative to another element with respect to the conveying direction.

The activation of the cross belt—at least with respect to a drive direction, a drive duration and/or a driving force—can preferably be effected in a manner depending on the mass of the conveyed material. The driving force acting on the cross belt can bring about a speed and/or a positive or negative acceleration of the cross belt.

More preferably, the cross belt may have been activated in such a manner that the conveyed material is conveyed along a cross transport path of the conveyed material from a charging position at a lateral edge of the conveying truck as far as the conveying position, or is conveyed from the conveying position to a discharging position at a lateral edge of the conveying truck.

The cross belt may preferably have been activated, in a manner depending on the mass of the conveyed material, over the entire cross transport path or for at least one mass-dependent subsection of the cross transport path or for no subsection of the cross transport path. The conveyed material can consequently be conveyed into the conveying position with increased accuracy, in a manner depending on its mass.

In particular, the mass-dependent drive of the cross belt may also be effected in respect of several subsections—that is to say, in interrupted manner.

Depending on the mass of the conveyed material, the cross belt may preferably have been activated and/or accelerated in the direction toward the conveying position and/or in the direction away from the conveying position.

In other words, depending on the mass of the conveyed material, the cross belt may have been activated and/or accelerated toward the conveying position in the direction of the cross transport path or away from the conveying position contrary to the direction of the cross transport path.

For instance, in the case of a lightweight conveyed material—in particular, a conveyed material with a mass of less than about 30 kg to about 5 kg—the cross belt can be driven for a longer period of time and/or at a higher speed than in the case of a heavier conveyed material, in order to convey the conveyed material to the desired conveying position with certainty. In this case, at the conveying position the conveyed material may still have a residual speed in the direction of the cross transport path—that is to say, a charging speed of the conveyed material is still greater than zero at the conveying position or shortly before reaching it. The residual speed can be slowed down to zero, in particular by means of activating the cross belt in the direction away from the conveying position, so that the conveyed material is not charged beyond the conveying position.

Particularly in the case of the lightweight conveyed material, for the purpose of attaining the longer drive duration and/or the higher drive speed of the cross belt a time of a beginning and/or of an end of the activation of the cross belt can be established in a manner depending on the mass of the conveyed material. For instance, the time of the beginning of the activating of the cross belt can be brought forward, and/or the time of the end of the activating of the cross belt can be put back.

For instance, in the case of a heavy conveyed material—in particular, a conveyed material with a mass greater than about 35 kg to about 50 kg—the activating of the cross belt in the direction of the cross transport path can be dispensed with, since the conveyed material is being conveyed into the conveying position solely by virtue of its charging speed in the direction of the cross transport path. Where appropriate, by means of activating the cross belt in the direction away from the conveying position a residual speed of the conveyed material can be slowed down to zero in this case, so that the conveyed material is not charged beyond the conveying position.

In the case of the heavy conveyed material the cross belt can be driven for a shorter period of time and/or at a lower drive speed than in the case of a lighter conveyed material, in order to convey the material to the desired conveying position. In particular, for this purpose a time of a beginning and/or of an end of the activating of the cross belt can be established in a manner depending on the mass of the conveyed material. For instance, the time of the beginning of the activating of the cross belt can be put back, and/or the time of the end of the activating of the cross belt ends can be brought forward.

A further aspect relates to a cross-belt sorter with at least one control device as described above and with at least one conveying truck with a cross-belt conveyor for conveying a conveyed material in a cross conveying direction oriented substantially at right angles to the conveying direction of the cross-belt sorter, the control device activating the cross belt in the course of the lateral charging and/or discharging of the conveyed material at least in a manner depending on a mass of the conveyed material.

Advantages of this aspect arise that are analogous to the advantages stated above relating to the control device.

The cross-belt sorter may preferably exhibit a charging belt for lateral charging of the conveyed material onto one of the conveying trucks, in which case the charging belt exhibits a mass-ascertaining apparatus for ascertaining the mass of the conveyed material and/or exhibits at least one discharge station for receiving conveyed material discharged laterally.

The charging belt for lateral charging of the conveyed material onto the conveying truck may exhibit several belt portions having differing functions.

For instance, the charging belt may exhibit a transfer-belt portion on which the conveyed material is aligned by means of an aligning apparatus. Furthermore, the charging belt may exhibit an acceptance-belt portion onto which the conveyed material is transferred. The transfer-belt portion may enclose an angle different from 180°, in particular an angle of 60°, with the transfer-belt portion. Consequently a space requirement of the charging belt can be kept small.

The charging belt may further include a timing-belt or buffer-belt portion and an angle-compensating portion—a so-called "strip merge"—for compensating for an installation angle between the charging belt and the cross-belt sorter. The installation angle between the charging belt and the cross-belt sorter may amount to about 30°, for instance. This contributes further toward keeping the space requirement of the charging belt small.

An acceleration of the conveyed material to the charging speed can preferably be effected in the timing-belt or buffer-belt portion. As an alternative or in addition to this, the acceptance-belt portion and/or the transfer-belt portion and/or the angle-compensating portion may also exhibit a drive for accelerating the conveyed material. The timing-belt or buffer-belt portion is the region between the acceptance-belt portion and the angle-compensating portion.

The mass of the conveyed material in the course of the transportation on the charging belt can preferably be ascertained by means of a registered current consumption of an electric motor for accelerating the conveyed material to a target speed, in particular to a constant target speed, or by means of a weighing device arranged in the charging belt. The mass can expediently be ascertained in the timing-belt or buffer-belt portion.

The cross belt may preferably be capable of being driven by means of a friction-roller drive, in which case the friction-roller drive exhibits a friction wheel, arranged on the conveying truck, and a first and second actuating flap arranged in stationary manner with respect to the conveying direction and capable of swiveling in the cross conveying direction. The actuating flaps may have been arranged opposite one another in the cross conveying direction and may consequently accommodate the friction wheel between the actuating flaps. The cross conveying direction may comprise a first cross conveying direction—for example, for discharging to the left—and a second cross conveying direction oriented contrary to the first—for example, for discharging to the right.

More preferably, the cross belt may be capable of being driven in the first cross conveying direction by means of a contact of the friction wheel with the first actuating flap, and/or may be capable of being driven in the second cross conveying direction by means of a contact of the friction wheel with the second actuating flap.

Consequently it is also conceivable to decelerate a conveyed material which has been accelerated toward the conveying position in the direction of the cross transport path by means of the first actuating flap, for instance, away from the conveying position contrary to the direction of the cross transport path with the second actuating flap simultaneously for at least one transition phase, in order to keep a change of load on the conveyed material—and hence a danger of tipping of the conveyed material—slight.

In particular, the conveyed material can reach the conveying position by means of a so-called "running-down" (coasting of the conveyed material toward the conveying position in the direction of the cross transport path without cross belt activated by the control device). The conveyed material consequently reaches the conveying position at a speed—maintained by, amongst other things, its inertia—which is slowly retarded to zero by the friction of the moving parts in the cross-belt conveyor. Hence a danger of tipping of the conveyed material, which is otherwise elevated in the event of abrupt decelerating of the conveyed material, is kept slight.

The actuating flaps may advantageously have been divided up into several sub-regions along the cross-belt sorter. The cross belt, to be activated, of the conveying truck can consequently be activated over a relatively long route by means of different actuating flaps.

A further aspect relates to a method for lateral charging and/or discharging of a conveyed material onto and/or from a conveying truck of the described cross-belt sorter, with the following steps:
- ascertaining a mass of the conveyed material to be charged
- lateral charging of the conveyed material onto a cross belt of the conveying truck, and/or lateral discharging of the conveyed material from a cross belt of the conveying truck and
- activating the cross belt in a manner depending on the mass of the conveyed material by means of the previously described control device for transporting the conveyed material into the conveying position and/or out of the conveying position on the cross belt.

Advantages of this aspect arise that are analogous to the advantages stated above relating to the control device and/or to the cross-belt sorter.

Data relating to the mass of the conveyed material are preferably communicated to the control device prior to the lateral charging of the conveyed material.

Exemplary embodiments of the control device according to the invention and of the cross-material sorter according to the invention are elucidated in more detail below on the basis of drawings. It will be understood that the present invention are not restricted to the exemplary embodiments described below, and that individual features thereof may be combined to form further exemplary embodiments.

BRIEF DESCRIPTION OF THE DRAWINGS

Shown are:
FIG. 2 a cross-section through a conveying truck with cross-belt conveyor

DETAILED DESCRIPTION OF THE PREFERRED EMBODIMENTS

Figure 1:
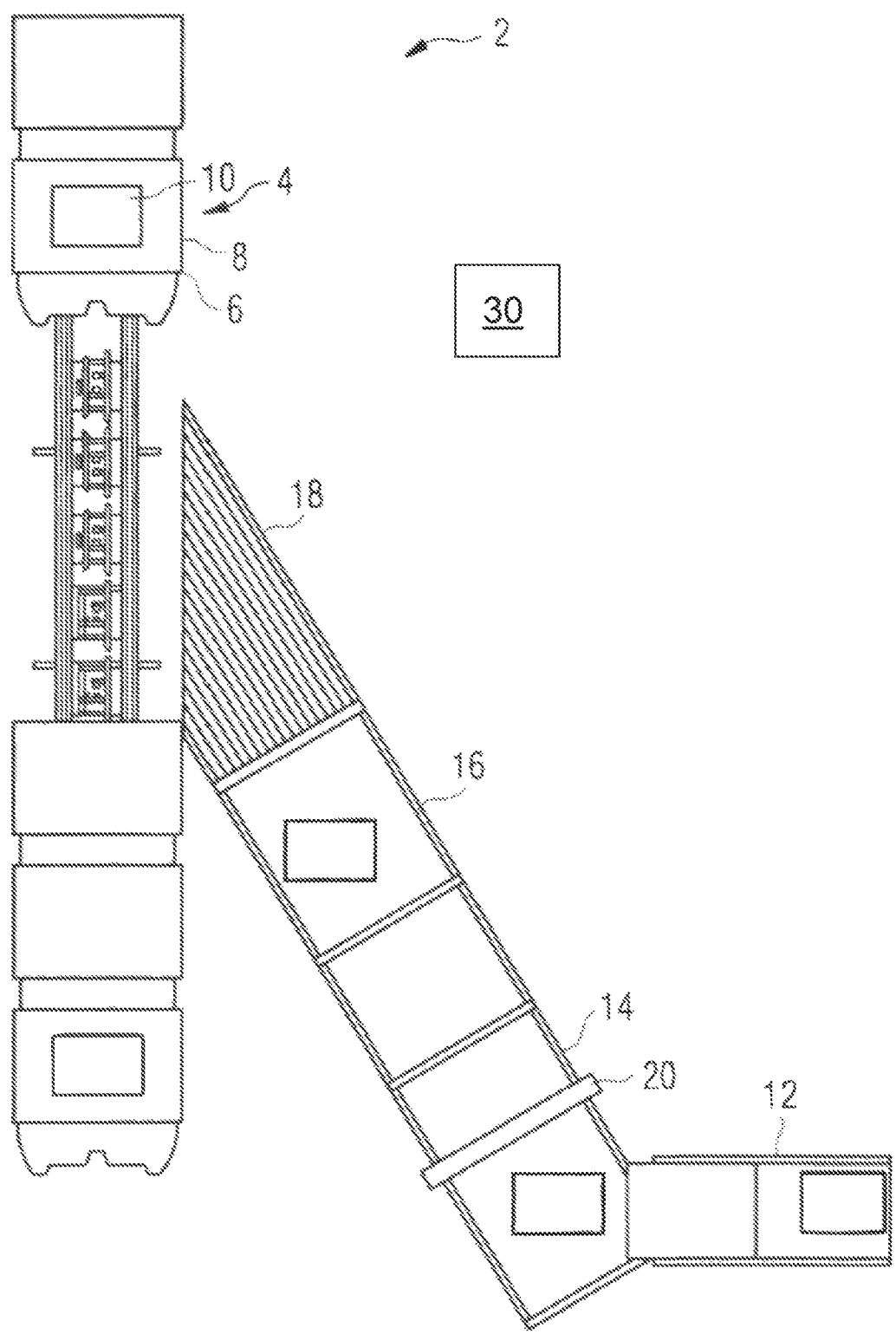
FIG. 1 a top view of a portion of a cross-belt sorter.

The portion of a cross-belt sorter 2 shown in FIG. 1 consists, on the one hand, of a cross-belt conveyor 4 which, in turn, has been assembled from individual conveying trucks 6 connected to one another. It will be understood that the cross-belt conveyor 4 is constructed as a closed system consisting of a plurality of conveying trucks 6, in order to cover a particular conveying route (for instance, an oval).

Each conveying truck 6 exhibits a cross belt 8 onto which a conveyed material 10 can be charged which can subsequently be discharged by motion of the cross belt 8 to one side or the other. The discharging is effected into chutes or slides arranged laterally alongside the conveying trucks 6 in the course of the conveying route, which are not represented in FIG. 1.

For the purpose of charging the conveyed material 10, it is firstly loaded onto a transfer belt 12 and transported to an acceptance belt 14 and transferred thereto. The acceptance belt 14 may consist of several timing-belt or buffer-belt portions 16 situated one behind the other.

An angle-compensating portion 18, which preferentially may take the form of a so-called "strip merge", serves as a connection between the acceptance belt 14 and the conveying truck 6. Such a merge consists of individual narrow belts arranged alongside one another in parallel, which in the connecting region are moved onto the acceptance belt 14 via a driven diverting roller.

A mass-ascertaining apparatus 20 serves for the ascertainment, according to the invention, of the mass of the conveyed material 10. It will be understood that the respective conveyed material 10 may have an extremely wide range of masses—colloquially, an extremely wide range of weights.

As explained in the introduction, the varying masses influence the position of the conveyed material 10 on the conveying truck 6 or, to be more exact, on the cross belt 8. This is the case, in particular, when the cross belt 8 of the conveying truck 6 is not held in a state of rest and is set in motion by application or charging of, in particular, a conveyed material 10 having a large mass. In order to be able to take varying masses of the respective conveyed material 10 into account, in accordance with the invention the mass-ascertaining apparatus 20 is provided. The latter may be an apparatus for registering the mass—for instance, a weighing device—or an apparatus for registering a current consumption (or a torque) of the drive elements (as a rule, of the drive motors) for driving the timing-belt or buffer-belt portions 16. In particular, synchronous drum motors come into operation by way of drive motor. As is generally known, the timing-belt or buffer-belt portions 16 are belt conveyors, the belts of which are moved via the aforementioned drive elements. In this connection it will be understood that in the course of the motion of a conveyed material 10 having a large mass a higher current consumption obtains at the drive motor than in the case of a lower mass. This is because the acceleration is to be kept constant in the region of the timing-belt or buffer-belt portions 16, or in the region of the timing-belt or buffer-belt portions 16 a particular final speed is to be attained, starting from a particular initial speed. The values for the current consumption—in particular, the maximum current consumption, where appropriate the total current consumption—corresponding to the respective mass of the conveyed material 10 can then be ascertained empirically. Instead of the current consumption, the torque—in particular, the maximum torque—can also be ascertained. The values ascertained in this manner serve to adjust the control device for driving the cross belt 8 of the respective conveying truck 6 in such a way that the respective conveyed material 10 to be charged onto the conveying truck 6 takes up the desired conveying position.

It is also conceivable that the mass-ascertaining apparatus registers the appropriate values in the region of the transfer belt 12 or in the region of the angle-compensating portion 18.

The aim is ultimately to ensure that the respective conveyed material 10 reaches a desired conveying position on the cross belt 8 of the conveying truck 6.

FIG. 2 shows a cross-section through a conveying truck 6 with a cross-belt conveyor 4, on the cross belt 8 of which a conveyed material 10 has been charged centrally. The direction of motion of the conveying trucks 6 arranged one behind the other is perpendicular to the plane of the page. The motion of the cross belt 8 is perpendicular to the direction of motion of the conveying trucks 6, accordingly to the right or to the left in FIG. 2.

The drive of the cross belt 8 is effected in known manner as described in EP 0 930 248 B1. In this case the drive consists of a friction wheel 22 arranged beneath the cross belt 8, which drives a friction roller via a gear mechanism. The friction wheel 22 is set in motion via actuating flaps 24, 26, by the actuating flaps 24, 26 being swiveled toward the friction wheel 22 during the motion of the conveying truck 6, in order to abut the friction wheel.

The control device influences a time and a duration of the abutment of the actuating flaps 24, 26 in a manner depending on the ascertained mass of the conveyed material 10 charged onto the cross belt 8. In this connection it will be understood that, for instance, in the course of the abutment of actuating flap 24 against the friction wheel 22 for the drive thereof a correction of the resulting speed or run-off distance of the cross belt 8 can be effected by the opposing actuating flap 26. In this case, actuating flap 24 serves for the drive, and the opposing actuating flap 26 serves for decelerating or retarding the friction wheel 22 and consequently the cross belt 8.

If, for instance, a conveyed material 10 of high mass is charged onto the cross belt 8, under certain circumstances it may not be necessary to drive the cross belt 8, since the motion of the charged conveyed material 10 is sufficient to move the cross belt 8, in order to convey the conveyed material 10 into the desired conveying position (preferentially centrally) on the cross belt 8. It may even be necessary to decelerate or to stop the motion of the cross belt 8, resulting by virtue of the charging of the conveyed material 10, by the abutment of the corresponding actuating flap 24, 26 against the friction wheel 22, in order to ensure that the conveyed material 10 will not be conveyed too far beyond the desired conveying position.

In the case of a comparatively low mass of the conveyed material 10, on the other hand, it may be necessary to provide for a drive of the friction wheel 22 by means of the corresponding actuating flap 24, 26, since the motion of the cross belt 8 resulting by virtue of the charging of the lightweight conveyed material 10 may turn out to be too slight to convey the conveyed material 10 into the desired conveying position on the cross belt 8 without any drive.

The corresponding motions of the actuating flaps 24, 26 are effected by means of the control device in a manner depending on the aforementioned values corresponding to the respective mass of the conveyed material 10. This applies not only to the charging of the conveyed material 10 but also to the discharging of the conveyed material 10. In other words, the ascertained masses of the respective conveyed material 10 are intended to influence the control device and consequently the motion of the actuating flaps 24, 26 even when the conveyed material 10 is being discharged from the cross belt 8.

LIST OF REFERENCE NUMERALS 2 cross-belt sorter
4 cross-belt conveyor
6 conveying truck
8 cross belt
10 conveyed material
12 transfer belt
14 acceptance belt
16 timing-belt or buffer-belt portion
18 angle-compensating portion
20 mass-ascertaining apparatus
22 friction wheel
24 actuating flap
26 actuating flap

The invention claimed is:

1. A control device for activating a cross belt of a conveying truck of a cross-belt sorter, wherein a cross-belt conveyor for conveying a conveyed material in a cross conveying direction oriented substantially at right angles to the conveying direction of the cross-belt sorter has been formed on the conveying truck, and wherein the cross belt is capable of being driven mechanically,
   wherein the control device is configured
      to activate the cross belt during lateral charging of the conveyed material onto the cross belt in such a manner that the conveyed material is transported to a conveying position on the cross belt;
   wherein during lateral charging of the conveyed material the control device activates the cross belt at least in a manner depending on a mass of the conveyed material
   wherein the cross belt has been activated in such a manner that the conveyed material is conveyed along a cross transport path of the conveyed material from a charging position at a lateral edge of the conveying truck as far as the conveying position,
   and wherein the cross belt is accelerated in the direction away from the conveying position, depending on the mass-conveyed material.

2. The control device as claimed in claim 1, wherein the activation of the cross belt is effected—at least with respect to a drive direction, a drive duration and/or a driving force—in a manner depending on the mass of the conveyed material.

3. The control device as claimed in claim 1, wherein, depending on the mass of the conveyed material, the cross belt has been activated
   over the entire cross transport path or
   for at least one mass-dependent subsection of the cross transport path or for no subsection of the cross transport path.

4. A cross-belt sorter with at least one control device as claimed in claim 1 and with at least one conveying truck with a cross-belt conveyor for conveying a conveyed material in a cross conveying direction oriented substantially at right angles to the conveying direction of the cross-belt sorter, wherein during lateral charging of the conveyed material the control device activates the cross belt at least in a manner depending on a mass of the conveyed material.

5. The cross-belt sorter as claimed in claim 4 with a charging belt for lateral charging of the conveyed material onto one of the conveying trucks, wherein the charging belt exhibits a mass-ascertaining apparatus for ascertaining the mass of the conveyed material, and/or with at least one discharge station for receiving conveyed material discharged laterally.

6. The cross-belt sorter as claimed in claim 5, wherein in the course of the transportation on the charging belt the mass of the conveyed material has been ascertained
   by means of a registered power consumption of an electric motor for accelerating the conveyed material to a target speed or
   by means of a weighing device arranged in the charging belt.

7. A method for lateral charging of a conveyed material onto a conveying truck of the cross-belt sorter as claimed in claim 6, with the following steps:
   ascertaining a mass of the conveyed material to be charged
   lateral charging of the conveyed material onto a cross belt of the conveying truck, and
   activating the cross belt in a manner depending on the mass of the conveyed material by means of a control device as claimed in claim 1 for transporting the conveyed material into the conveying position on the cross belt.

8. The method as claimed in claim 7, wherein data relating to the mass of the conveyed material are communicated to the control device prior to the lateral charging of the conveyed material.

9. The method according to claim 7, wherein the following steps are carried out to laterally discharge conveyed material from the conveying truck of the cross-belt sorter:
- lateral discharging of the conveyed material from the cross belt of the conveying truck and
- activating the cross belt in a manner depending on the mass of the conveyed material by means of the control device as claimed in claim 1 for transporting the conveyed material from the conveying position on the cross belt.

10. The cross-belt sorter according to claim 4, wherein during lateral discharging of the conveyed material the control device also activates the cross belt at least in a manner depending on a mass of the conveyed material.

\* \* \* \* \*